US012476258B2

(12) United States Patent
Wang et al.

(10) Patent No.: US 12,476,258 B2
(45) Date of Patent: Nov. 18, 2025

(54) BATTERY CELL WITH SUPPLEMENTAL CURRENT COLLECTORS

(71) Applicant: Rivian IP Holdings, LLC, Irvine, CA (US)

(72) Inventors: Meng Wang, Pleasanton, CA (US); Debaditya Biswas, San Jose, CA (US); Daniel Matthew Davies, San Francisco, CA (US); Kenton Robert Harris, Bloomington, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/410,797

(22) Filed: Jan. 11, 2024

(65) Prior Publication Data

US 2025/0233159 A1    Jul. 17, 2025

(51) Int. Cl.
*H01M 50/538* (2021.01)
*H01M 4/66* (2006.01)
*H01M 50/107* (2021.01)
*H01M 50/536* (2021.01)

(52) U.S. Cl.
CPC ......... *H01M 4/667* (2013.01); *H01M 50/107* (2021.01); *H01M 50/536* (2021.01); *H01M 50/538* (2021.01); *H01M 2220/20* (2013.01)

(58) Field of Classification Search
CPC .. H01M 4/667; H01M 50/107; H01M 50/538; H01M 50/536; H01M 2220/20
See application file for complete search history.

(56) References Cited

U.S. PATENT DOCUMENTS

| | | | | |
|---|---|---|---|---|
| 2001/0038945 | A1* | 11/2001 | Kitoh | H01M 50/533 429/211 |
| 2003/0224242 | A1* | 12/2003 | Kaito | H01M 50/193 429/231.95 |
| 2012/0009451 | A1* | 1/2012 | Yoo | H01M 10/0431 429/94 |
| 2019/0379028 | A1* | 12/2019 | Lim | H01M 4/13 |
| 2020/0144676 | A1 | 5/2020 | Tsuruta et al. | |

* cited by examiner

*Primary Examiner* — Lingwen R Zeng
(74) *Attorney, Agent, or Firm* — BAKERHOSTETLER

(57) ABSTRACT

Aspects of the subject disclosure relate to battery cells having an electrode roll, and one or more current collectors at one or more ends of the electrode roll. Tabs extending from electrodes of the electrode roll at an end of the electrode roll may be folded into contact with the current collector at that end of the electrode roll, without overlapping the tabs. This may help to reduce the amount of space occupied by the tabs at the ends of the battery cell, which can facilitate an increase in electrode size that allows for an increased energy density and/or power capacity of the battery cell.

16 Claims, 10 Drawing Sheets

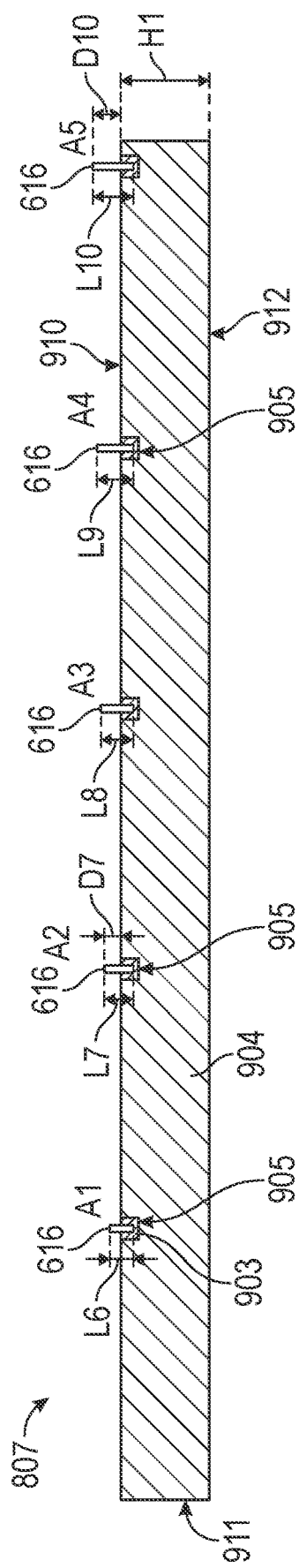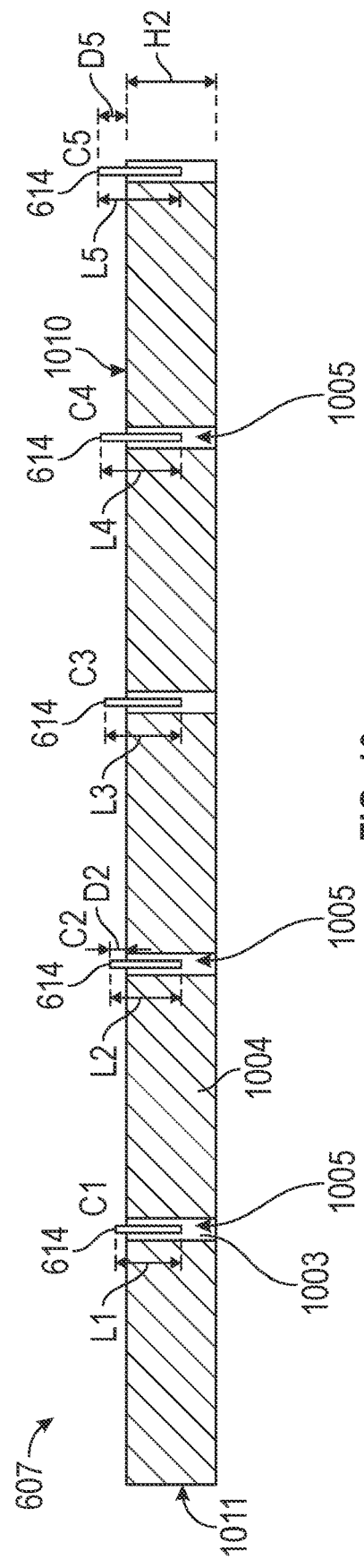

BATTERY CELL WITH SUPPLEMENTAL CURRENT COLLECTORS

INTRODUCTION

Batteries are often used as a source of power, including as a source of power for electric vehicles that include wheels that are driven by an electric motor that receives power from the battery.

Aspects of the subject technology can help to improve the efficiency, energy density and/or power capacity of battery cells, which can improve the efficiency and range of electric vehicles, which can help to mitigate climate change by reducing greenhouse gas emissions.

SUMMARY

Aspects of the subject disclosure relate to battery cells having an electrode roll (e.g., a jelly roll), and one or more current collectors at one or more ends of the electrode roll. Tabs extending from electrodes of the electrode roll at an end of the electrode roll may be folded into contact with the current collector at that end of the electrode roll, without overlapping the tabs. This may help to reduce the amount of space occupied by the tabs at the ends of the battery cell, which can facilitate an increase in electrode size that allows for an increased energy density and/or power capacity of the battery cell.

In accordance with aspects of the disclosure, a battery cell is provided that includes an electrode roll having a first end, an opposing second end, an axis extending from the first end to the opposing second end, and at least one rolled electrode; a current collector arranged perpendicularly to the axis and mounted to the first end; and a plurality of tabs extending from the at least one rolled electrode to the current collector. The plurality of tabs may have a plurality of respective lengths, and the plurality of respective lengths may increase with increasing radial distance of the tabs from the axis.

The plurality of tabs may extend from the at least one rolled electrode at a plurality of respective locations that are at a plurality of different respective distances from the axis of the electrode roll. The plurality of respective locations may be at a plurality of different circumferential locations around the axis.

The at least one rolled electrode may include a first rolled electrode layer that includes a first current collector layer; and a second rolled electrode layer that includes a second current collector layer. The plurality of tabs may extend from a plurality of respective uncoated regions of the first current collector layer, and the battery cell may also include an additional plurality of tabs that extend from an additional plurality of respective uncoated regions of the second current collector layer.

The battery cell may also include an additional current collector arranged perpendicularly to the electrode roll and mounted to the opposing second end of the electrode roll. The additional plurality of tabs may extend from the additional plurality of respective uncoated regions of the second current collector layer into contact with the additional current collector.

The current collector may include a planar portion arranged perpendicularly to the axis, and a first extension that extends away from the planar portion into contact with a cap of the battery cell. The additional current collector may include a planar portion arranged perpendicularly to the electrode roll and a second extension that extends away from the planar portion of the additional current collector and into contact with a housing of the battery cell. The battery cell may also include an insulting layer disposed between the current collector and the first end of the electrode roll. The plurality of tabs may extend from the at least one rolled electrode to the current collector without overlapping with each other.

In accordance with other aspects of the disclosure, an electrode may be provided that includes a current collector layer; a coated region; a plurality of uncoated regions spaced apart along an edge of the current collector layer; and a plurality of tabs electrically coupled to, and extending from, the plurality of uncoated regions, respectively, in which the plurality of tabs include a first tab having a first length and a second tab having a second length greater than the first length. The plurality of uncoated regions may include a plurality of coating-removed regions from which a portion of a coating on the current collector layer has been removed. The plurality of tabs may have a plurality of respective lengths that increase with increasing distance from a first edge of the electrode. Each tab of the plurality of tabs may be welded to a respective one of the plurality of uncoated regions.

In accordance with other aspects of the disclosure, a current collector for a battery cell may be provided, the current collector including a planar portion configured to be mounted to a first end of an electrode roll; and an extension that extends away from the planar portion and is configured to be electrically coupled to a cap for the battery cell. The battery cell may be a cylindrical battery cell and the planar portion may be a substantially circular planar portion having a substantially circular outer edge. The extension may extend from the substantially circular outer edge. The current collector may also include a central opening in the planar portion, the central opening configured to align with an axis of the electrode roll and allow access, through the opening, into an open bore that extends along the axis of the electrode roll. The extension may extend, at a first end thereof, from the substantially circular outer edge, and may be configured to bend such that a second end thereof is positioned over a portion of the central opening, the second end configured to be welded to the cap.

BRIEF DESCRIPTION OF THE DRAWINGS

Certain features of the subject technology are set forth in the appended claims. However, for purpose of explanation, several embodiments of the subject technology are set forth in the following figures.

FIG. 9 illustrates an example of an electrode, in an unrolled configuration, in accordance with one or more implementations.

FIG. 10 illustrates another example of an electrode, in an unrolled configuration, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a battery cell having (e.g., in addition to one or more current collector layer(s) of a jelly roll), a positive current collector and a negative current collector. The positive current collector may be welded to tabs extending from the cathode layer (e.g., at the top of the cell) and to a cap of the cell, and the negative current collector may be welded to tabs extending from the anode layer (e.g., at the bottom of the cell) and to a housing or can of the cell. Insulating layers may be provided at the top and bottom of the cell to insulate the positive current collector and the negative current collector from the jelly roll (e.g., other than the connection via the conductive welds to the tabs). The tabs extending from the cathode layer and the tabs extending from the anode layer may increase in length with increased radial distance from the center of the cell, so that the tabs originating at larger radii can reach the positive and negative current collectors.

Providing the positive and negative current collectors can provide increased energy density and/or power capacity, particularly for large format cylindrical cells, such as by reducing the amount of space at the top and bottom of the cell that is used for accommodating tabs, foil flags, and/or welds. Providing the positive and negative current collectors can also simplify manufacturing relative to, for example, an implementation in which the tabs or other electrode extensions are radially aligned.

Figure 1A:
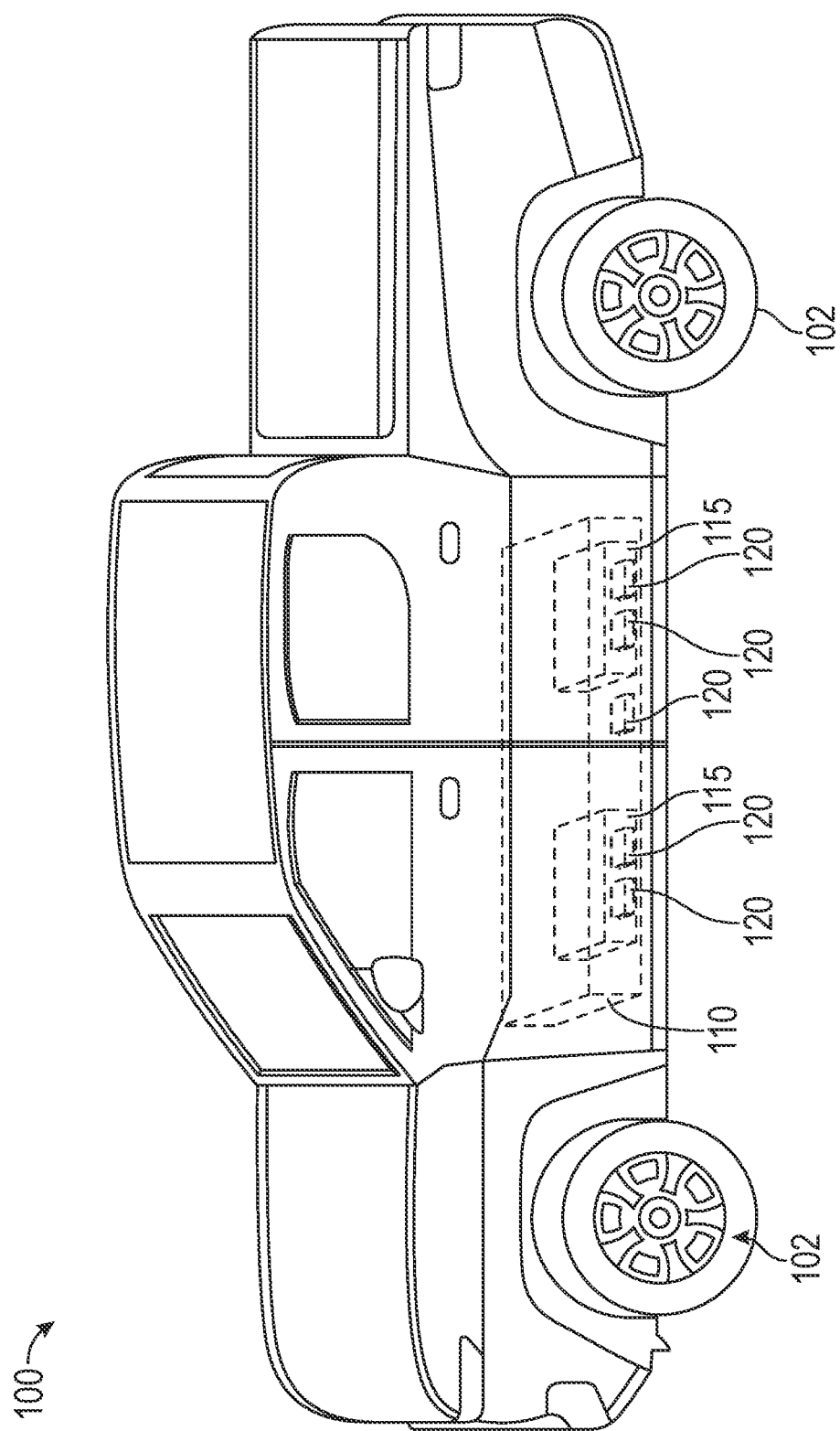
FIGS. 1A and 1B illustrate schematic perspective side views of example implementations of a vehicle having a battery pack in accordance with one or more implementations.

FIG. 1A is a diagram illustrating an example implementation of an apparatus as described herein. In the example of FIG. 1A, the apparatus is a moveable apparatus implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
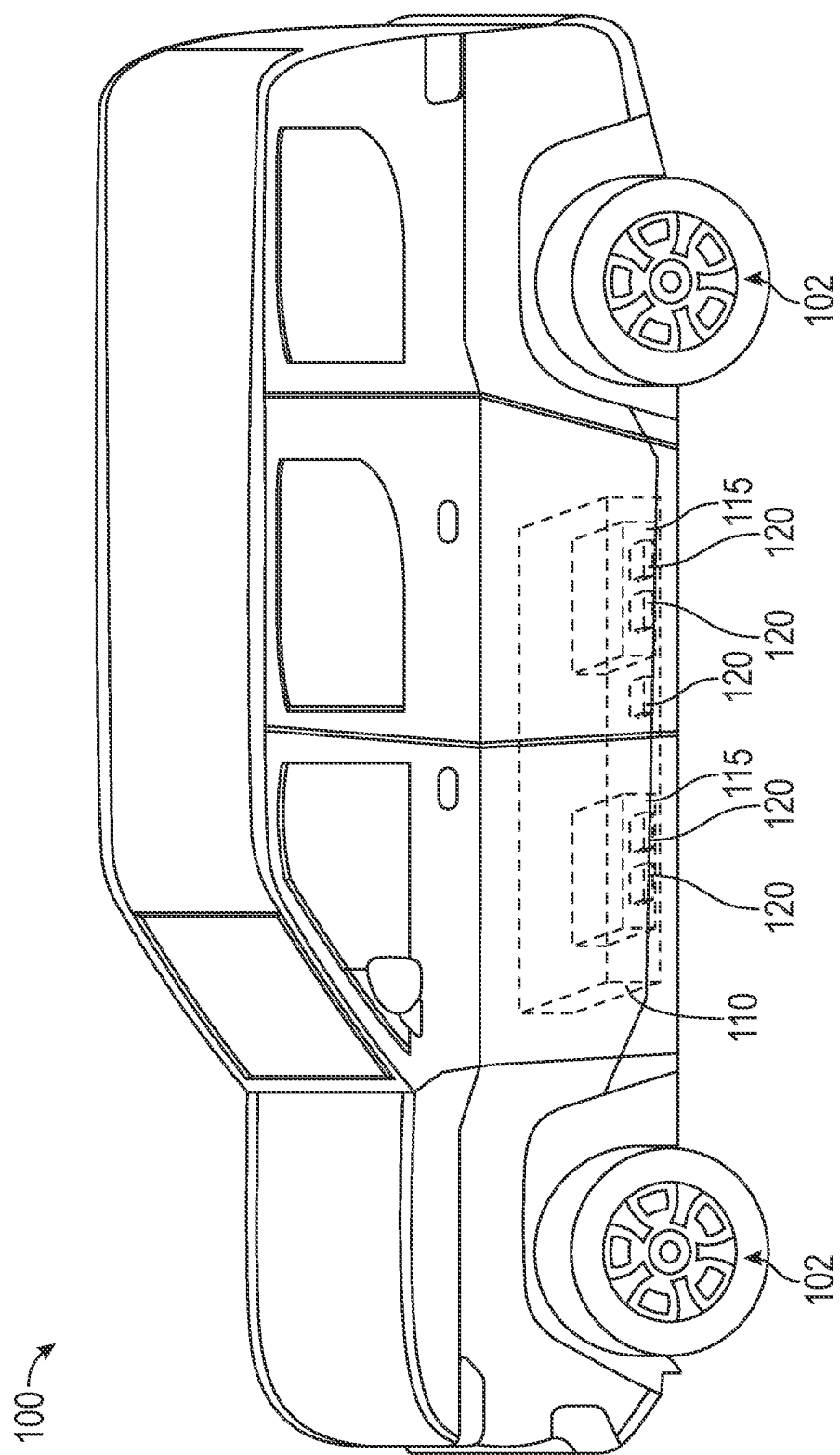

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
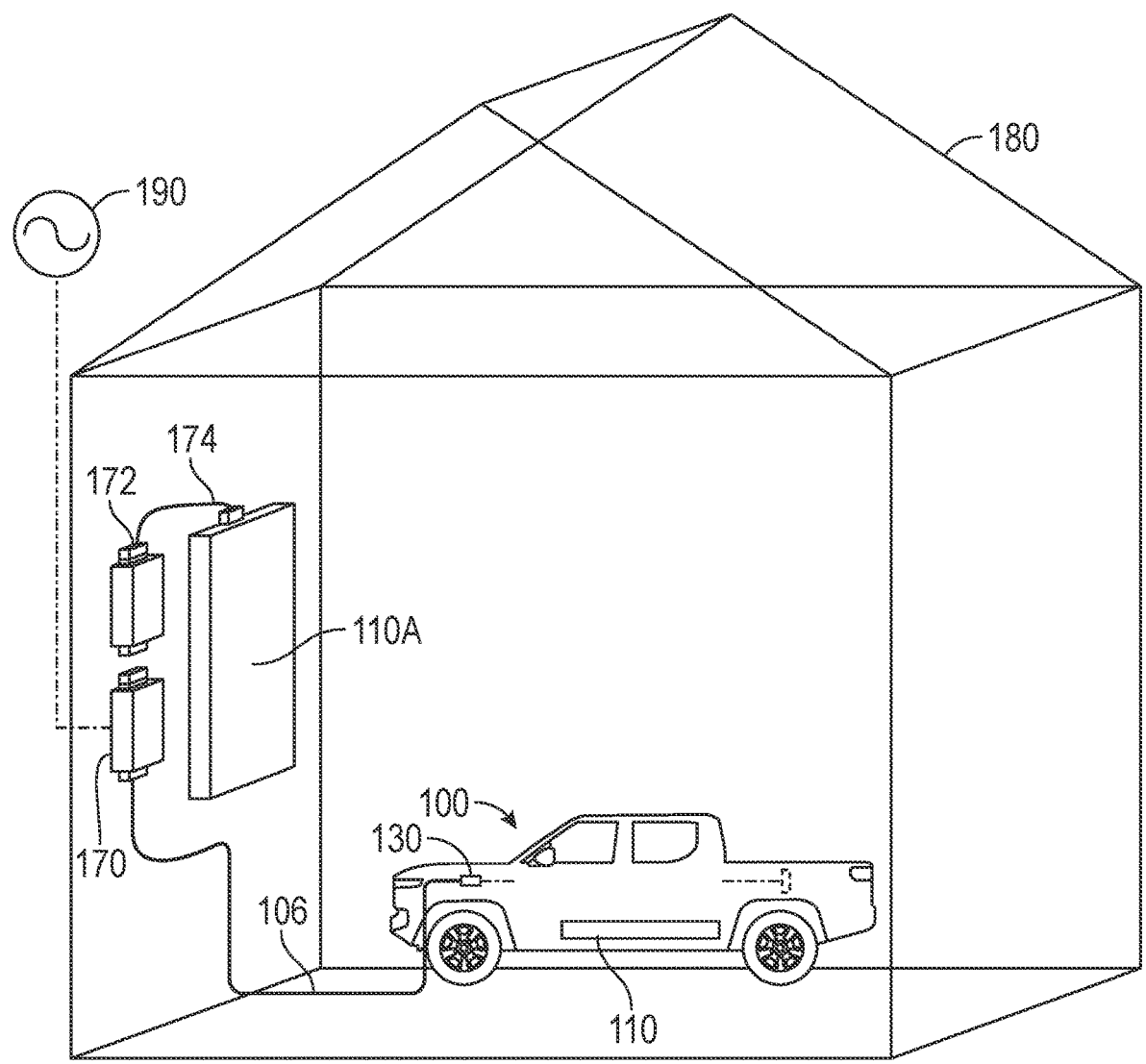
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
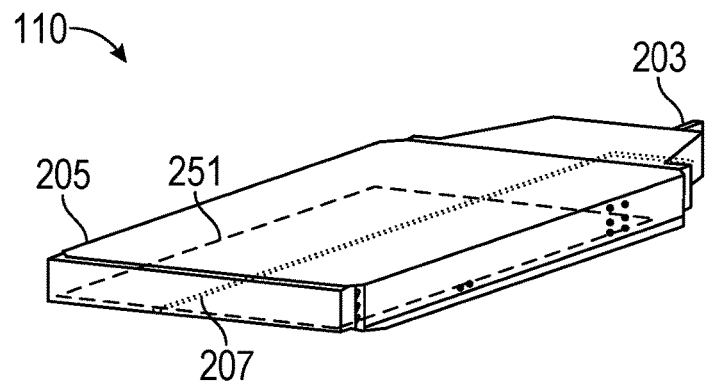
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 251 such as plates or bladders that are disposed in thermal contact with one or more battery modules 115 and/or battery cells 120 disposed within the battery pack frame 205. For example, a thermal component 251 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
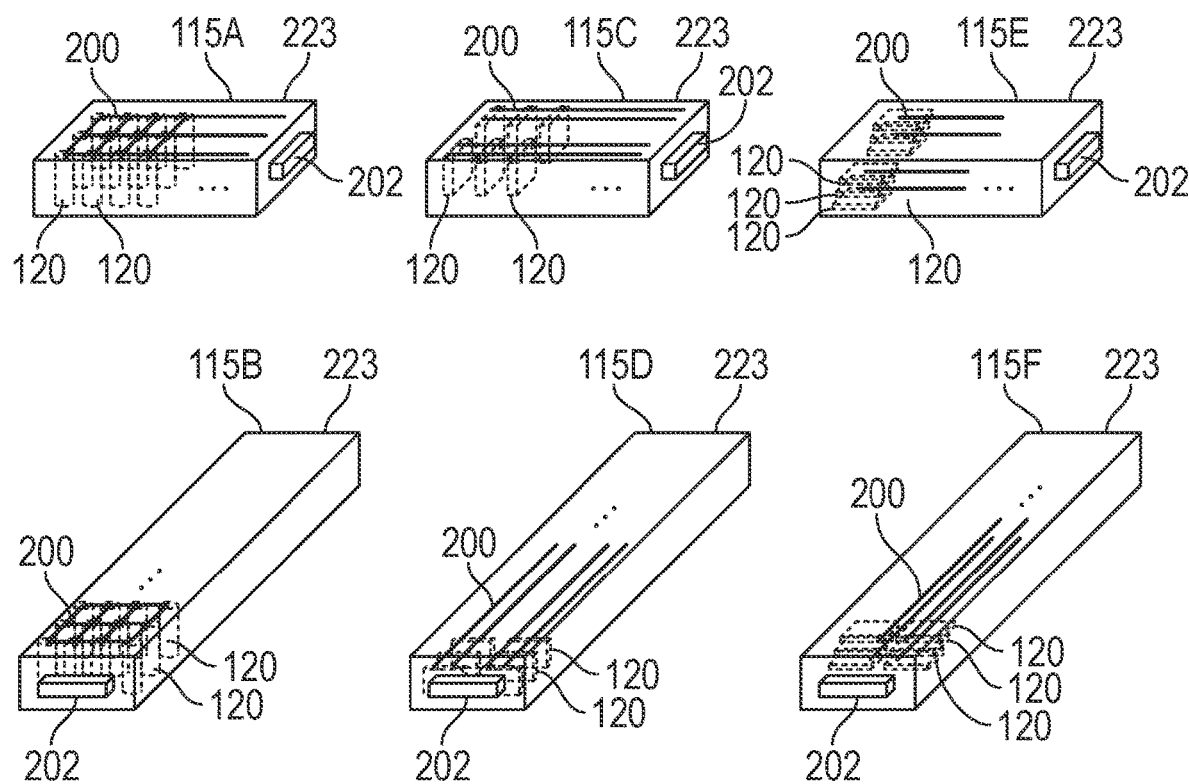
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width, and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
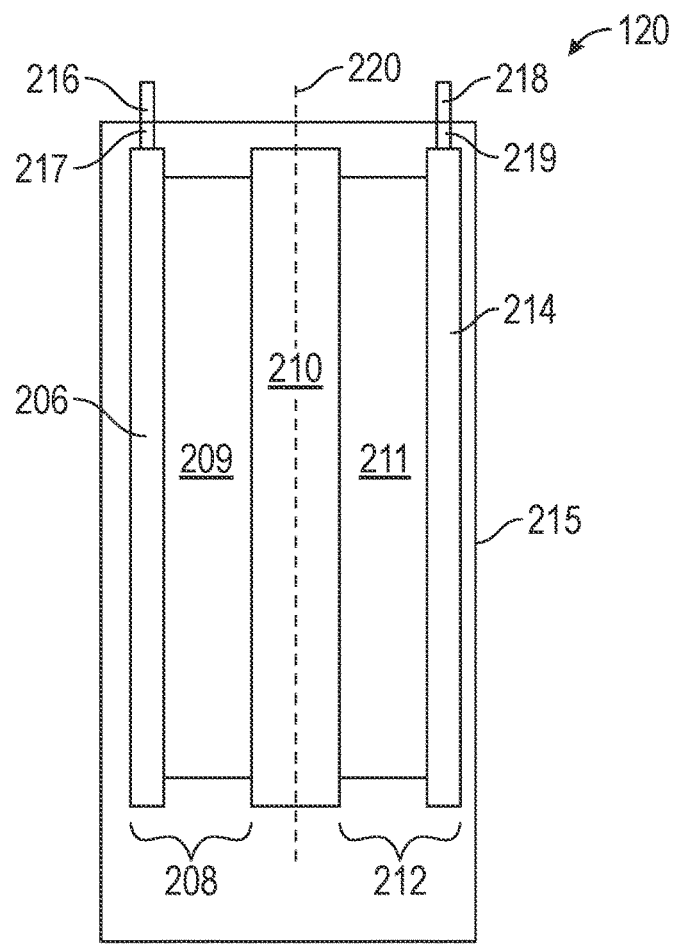
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). For example, an anode material 209 may be coated on a region of a surface of the current collector 206 to form the anode 208. As shown, the cathode 212 may include or be electrically coupled to a second current collector 214 (e.g., a metal layer such as a layer of aluminum foil or other metal foil). For example, a cathode material 211 may be coated on a region of a surface of the current collector 214 to form the cathode 212.

As shown, the battery cell 120 may include a first terminal 216 (e.g., a negative terminal) coupled to the anode 208 (e.g., coupled to the first current collector 206 via a tab 217) and a second terminal 218 (e.g., a positive terminal) coupled to the cathode (e.g., coupled to the second current collector 214 via a tab 219). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode material 209 is an anode active material formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode material 209 may be coated on a metal foil (e.g., a copper foil) corresponding to the first current collector 206. In these lithium ion implementations, the cathode material 211 may be a cathode active material formed from one or more metal oxides (e.g., a lithium cobalt oxide, a lithium manganese oxide, a lithium nickel manganese cobalt oxide (NMC), or the like) and/or a lithium iron phosphate. For example, the cathode material 211 may be coated on a metal foil (e.g., an aluminum foil) corresponding to the second current collector 214. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode material 209 may be formed from a hydrogen-absorbing alloy and the cathode material 211 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode material 209 may be formed at least in part from lithium, the cathode material 211 may be formed from at least in part form sulfur, and the electrolyte 210 may be formed from a cyclic ether, a short-chain ether, a glycol ether, an ionic liquid, a supersaturated salt-solvent mixture, a polymer-gelled organic media, a solid polymer, a solid inorganic glass, and/or other suitable electrolyte materials.

In various implementations, the anode 208, the electrolyte 210, and the cathode 212 of FIG. 2C can be packaged into a battery cell housing 215. In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 2D:
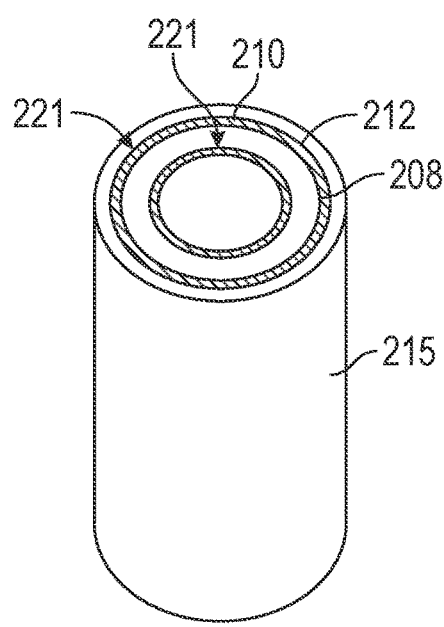
FIG. 2D illustrates a cross-sectional perspective view of a cylindrical battery cell in accordance with one or more implementations.

The cell housing 215 may have any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, separator layer 220, and the cathode 212 may be rolled into one or more substantially cylindrical or spiraled windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221.

Referring again to FIG. 2C, in order, for example, to connect the anode 208 and the cathode 212, respectively, to the first terminal 216 and the second terminal 218 (e.g., external terminals that are accessible from the outside of the battery cell 120), a battery cell 120, such as the cylindrical cell of FIG. 2D, may be provided with one or more tabs, such as the tab 217 and tab 219 of FIG. 2C, having a first portion that is welded to a current collector of the anode or the cathode. A second portion of each of tabs 217 and 219 may then be welded to the first terminal 216 or the second terminal 218 (e.g., via a cap of the battery cell in some implementations).

Figure 3:
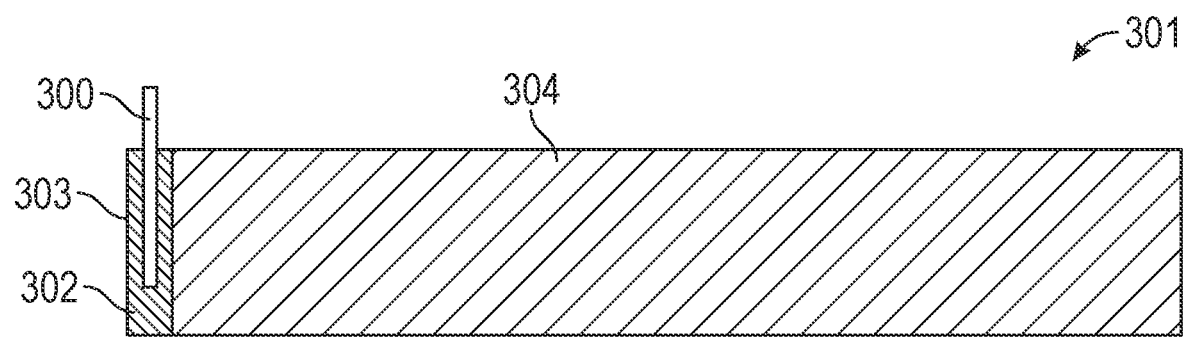
FIG. 3 illustrates an example of a single tab electrode, in an unrolled configuration, for a battery cell in accordance with one or more implementations.

For example, FIG. 3 illustrates an implementation in which an electrode 301 (e.g., an anode 208 or a cathode 212) for a cylindrical cell includes a single tab 300. As shown, the single tab 300 may be welded to an uncoated region 302 of a current collector 303 (e.g., an implementation of the first current collector 206 or the second current collector 214). As shown, the current collector 303 may also have a coated region 304 that is coated with an electrode material (e.g., anode material 209 or cathode material 211). In the example of FIG. 3, the electrode 301 is shown in an unrolled configuration, and can be rolled (e.g., together with a separator layer and another unrolled electrode) and encased in a cylindrical housing, such as the cell housing 215 of FIG. 2D. As shown, the tab 300 may include a portion that extends beyond an edge of the uncoated region 302 of the current collector 303, and that may be welded to a terminal (e.g., first terminal 216 or second terminal 218), such as terminals on a cap of a cylindrical cell.

Figure 4:
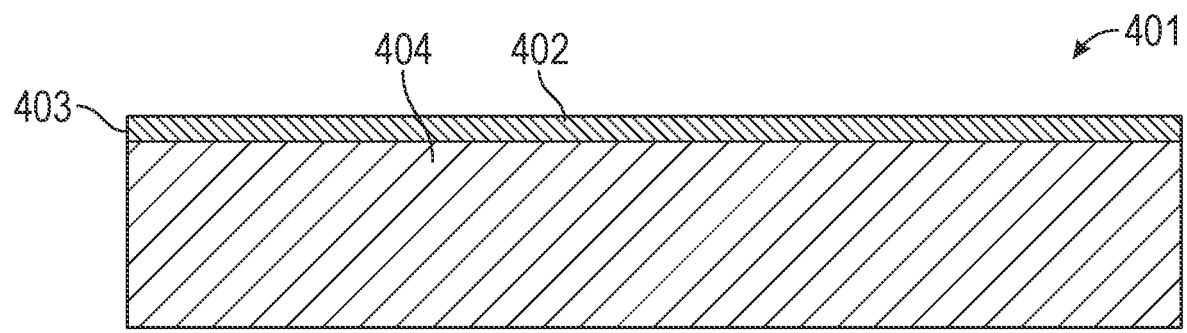
FIG. 4 illustrates an example of a tabless electrode, in an unrolled configuration, for a battery cell in accordance with one or more implementations.

However, in the single tab configuration of FIG. 3, in order for charges, such as electrons in the current collector, to travel to the tab 300, the charges in portions of the current collector 303 that are located away from the tab 300 may have a relatively long distance to travel through the current collector 303, which can create an undesirably large impedance for the battery cell. These current conductivity constraints can impede performance of larger diameter and/or taller cells. One option for reducing the path of travel of the charges in the current collector 303 is to provide a tabless electrode 401, with a single elongate uncoated extension 402 that runs along the entire long edge of a current collector 403 having a coated region 404, as shown in FIG. 4. In this configuration of FIG. 4, the entire single elongate uncoated extension 402 may be disposed in contact with a terminal of the battery cell 120. However, in the tabless configuration of FIG. 4, a significant height buffer (e.g., several millimeters) may be provided at top of the battery cell to accommodate for the volume of the single uncoated extension 402. Such a height buffer may cause a battery cell to have a lower energy density and/or capacity than a battery cell without such as height buffer.

Figure 5:
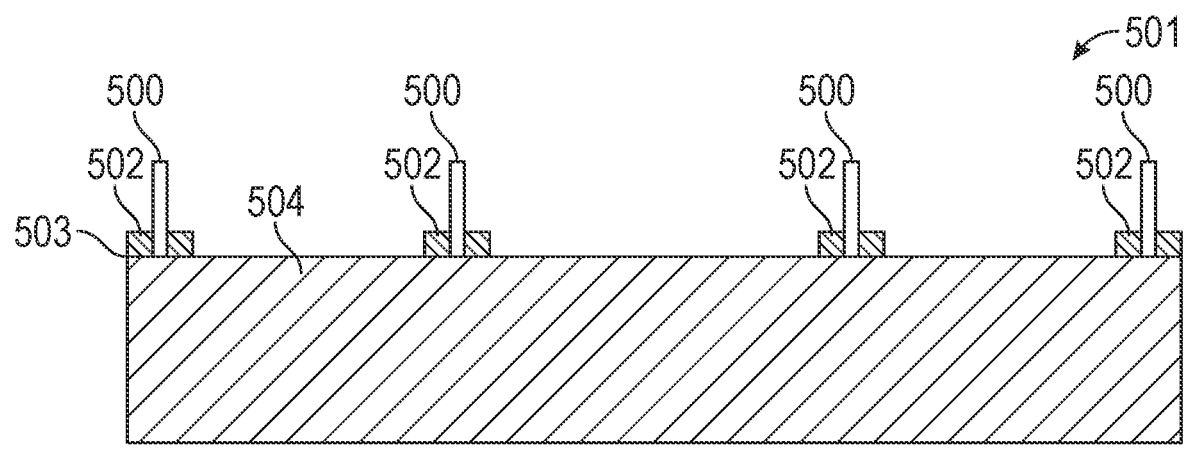
FIG. 5 illustrates an example of a multi-tab electrode, in an unrolled configuration, for a battery cell in accordance with one or more implementations.

Another option for reducing the path of travel of the charges in the current collector 303 is to provide a multi-tab electrode 501, as shown in FIG. 5. In this configuration of FIG. 5, the electrode 501 includes multiple uncoated extensions 502 of a current collector 503 that includes a coated region 504. In the example of FIG. 5, multiple tabs 500 are welded, respectively, to the multiple uncoated extensions 502, and each of the multiple tabs 500 may be welded to a terminal of the battery, such as by welding the multiple tabs 500 to a cap of the battery cell. In the example of FIG. 5, each of the multiple uncoated extensions 502 is the same size, same width, and same height, and the multiple uncoated extensions 502 are evenly spaced apart from each other on the edge of the current collector 503. In the multi-tab configuration of FIG. 5, assembling the battery cell may include a complex welding assembly process, with significant space occupied by overlapping of the welded multiple tabs 500, leading to a lower capacity battery cell, and/or yield and/or quality issues in the manufacturing process.

Figure 6:
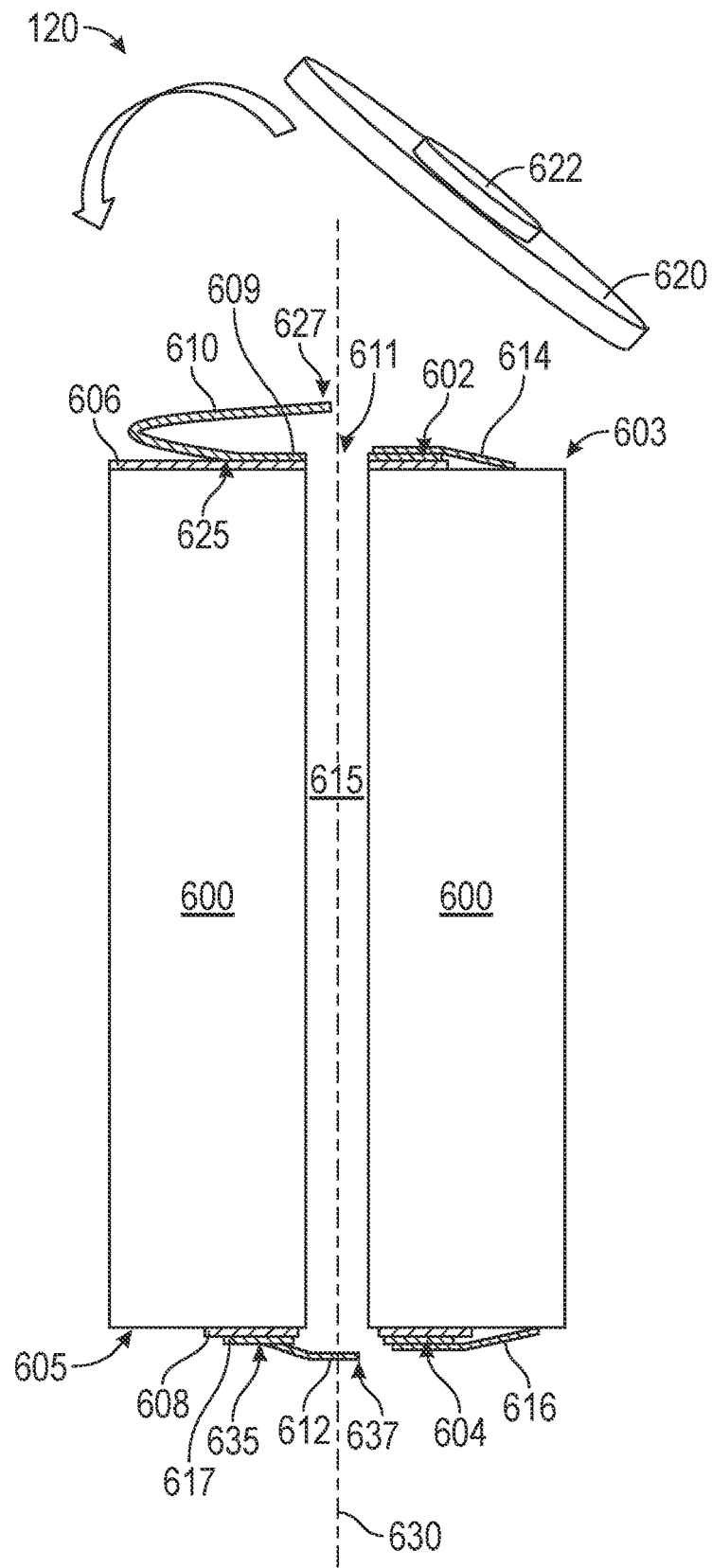
FIG. 6 illustrates a cross-sectional view of a battery cell having a supplemental current collector in accordance with one or more implementations.

In accordance with aspects of the subject disclosure, a battery cell, such as the battery cell 120, may be provided with one or more supplementary current collectors, which may reduce the space occupied by the welded tabs, and thereby facilitate an increase in energy density and/or power capacity for the cell (e.g., by facilitating a larger size of the anode and/or cathode electrodes). For example, FIG. 6 illustrates a battery cell 120 in an implementation in which the battery cell includes an electrode roll 600 having a first end 603, an opposing second end 605, and an axis 630 extending from the first end 603 to the opposing second end 605. The electrode roll 600 may be referred to herein as a "jelly roll" or a "Swiss roll" in some examples. For example, the electrode roll 600 may include at least one rolled electrode (e.g., a rolled anode 208 and/or a rolled cathode 212, which may be rolled with one or more insulating layers and/or electrolyte layers as described herein). In the example of FIG. 6, the electrode roll 600 is a cylindrical electrode roll. In other implementations, the electrode roll may be rolled into a flattened cylinder (e.g., in a hybrid wound prismatic stack configuration of the battery cell 120), which may be referred to as a jelly stack in some examples.

As shown in FIG. 6, the battery cell 120 may be provided with a current collector 602. The current collector 602 may be arranged perpendicularly to the axis 630 and mounted to the first end 603 of the electrode roll 600. As shown, an insulating layer 606 may be disposed between the current collector 602 and the first end 603 of the electrode roll 600. As shown, one or more tabs 614 may extend from the electrode roll 600 (e.g., from at least one rolled electrode in the electrode roll 600) to the current collector 602. For example, each tab 614 may electrically couple a portion of an electrode in the electrode roll 600 to the current collector 602. Further features of the tabs 614 will be described in further detail hereinafter.

As shown, the current collector 602 may include a planar portion 609 that is arranged perpendicularly to the axis 630. For example, the planar portion 609 may extend along (e.g., parallel to) a surface (e.g., top surface) of the electrode roll 600 (e.g., and across or over multiple windings of the electrodes of the electrode roll). For example, the insulating layer 606 may be placed on top of the electrode roll 600, and the current collector 602 may be placed on top of the insulating layer 606. The current collector 602 may be adhesively attached to the insulating layer 606, or may be held in place on the insulating layer 606 at the first end 603 of the electrode roll 600 by the welds to the tabs 614 and/or by a mechanical pressure (e.g., on the extension) from a cap 620 of the battery cell 120. The insulating layer 606 may be adhesively attached to the first end 603 of the electrode roll 600, or may be held in place on the first end 603 by the current collector 602 (e.g., by the welds between the tabs 614 and the current collector 602) and/or by mechanical pressure from the cap 620. In various implementations, the insulating layer 606 may be formed from an polymer material, such as polyethylene terephthalate (PET) or polytetrafluoroethylene (PTFE). The current collector 602 may be formed from a conductive material, such as a metal (e.g., copper, aluminum, another metal or metal alloy). The tabs 614 may be formed from a conductive material, such as a metal (e.g., copper, aluminum, another metal or metal alloy).

As shown, the current collector 602 may also include an extension 610 that extends away from the planar portion 609. For example, the extension 610 may include a first end 625 at the planar portion 609, and a second end 627 that is configured to contact the cap 620 of the battery cell 120. For example, the second end 627 of the extension 610 may be welded to a terminal 622 (e.g., an implementation of the terminal 218 of FIG. 2C) on the cap 620. For example, the current collector 602 may be a positive current collector that is coupled, by the tabs 614, to a cathode (e.g., cathode 212) of the electrode roll 600.

As shown, the extension 610 may be a flexible extension that is configured to extend from the planar portion of the current collector 602 in a first direction, and to bend into a substantially opposite direction into contact with the cap 620. As shown, the second end 627 of the extension may be separated vertically from than the first end, in a direction parallel to the axis 630.

As shown in FIG. 6, the battery cell 120 may also include a current collector 604 arranged perpendicularly to the electrode roll 600 and mounted to the second end 605 (e.g., an opposing second end that is opposite to the first end) of the electrode roll 600. As shown, an insulating layer 608 may be disposed between the current collector 604 and the second end 605 of the electrode roll 600. As shown, one or more tabs 616 may extend from the electrode roll 600 (e.g., from another electrode in the electrode roll 600) to the current collector 602. For example, each tab 616 may electrically couple an electrode (e.g., an anode, such as anode 208) in the electrode roll 600 to the current collector 604. Further features of the tabs 616 will be described in further detail hereinafter.

As shown, the current collector 604 may include a planar portion 617 that is arranged perpendicularly to the axis 630. For example, the planar portion 617 may extend along (e.g., parallel to) a surface (e.g., bottom surface surface) of the electrode roll 600 (e.g., and over or across multiple windings of the electrodes of the electrode roll). For example, the insulating layer 608 may be placed on the bottom of the electrode roll 600, and the current collector 604 may be placed over of the insulating layer 608. The current collector 604 may be adhesively attached to the insulating layer 608, or may be held in place on the insulating layer 608 at the second end 605 of the electrode roll 600 by the welds to the tabs 616 and/or by mechanical pressure (e.g., on the extension) from a housing (e.g., housing 215, such as a can, not shown in FIG. 6) of the battery cell 120. The insulating layer 608 may be adhesively attached to the second end 605 of the electrode roll 600, or may be held in place on the second end 605 by the current collector 604 (e.g., by the welds between the tabs 616 and the current collector 604) and/or mechanical pressure from the housing 215. In various implementations, the insulating layer 608 may be formed from an polymer material, such as polyethylene terephthalate (PET) or polytetrafluoroethylene (PTFE). The current collector 604 may be formed from a conductive material, such as a metal (e.g., copper, aluminum, another metal or metal alloy). The tabs 616 may be formed from a conductive material, such as a metal (e.g., copper, aluminum, another metal or metal alloy).

As shown, the current collector 604 may also include an extension 612 that extends away from the planar portion 617. For example, the extension 612 may include a first end 635 at the planar portion 617, and a second end 637 that is configured to contact a housing 215 of the battery cell 120. For example, the second end 637 of the extension 612 may be welded to a terminal (e.g., an implementation of the terminal 216 of FIG. 2C) on or extending from the housing 215. For example, the current collector 604 may be a negative current collector that is coupled, by the tabs 616, to an anode (e.g., anode 208) of the electrode roll 600.

As shown, the extension 612 may extend from the planar portion 617 of the current collector 604 at a location that is between a radial inner edge and a radial outer edge of the planar portion 617, toward a radial center of the planar portion 617, and vertically away from the planar portion 617 in a direction parallel to the axis 630.

Figure 7:
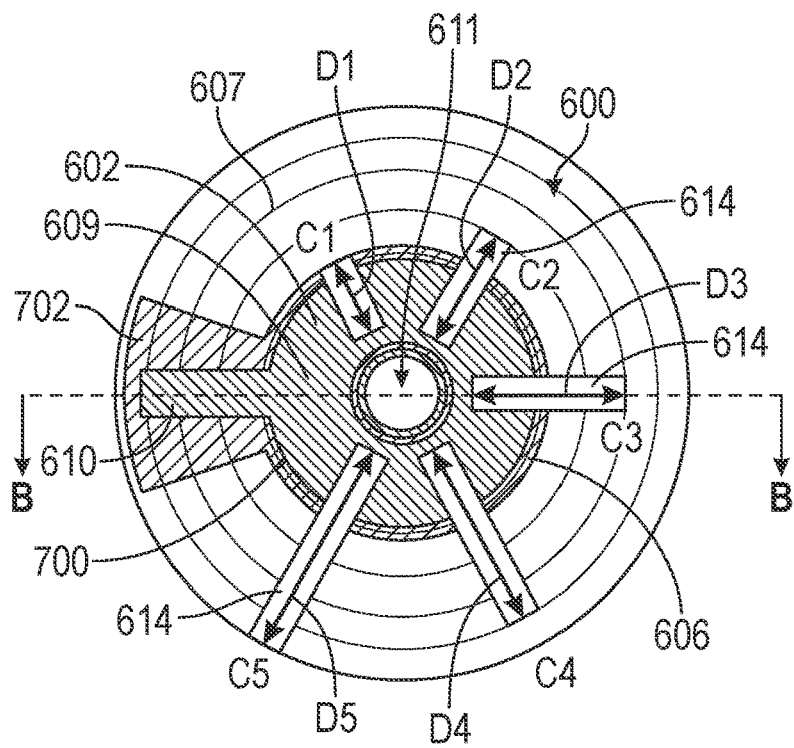
FIG. 7 illustrates a top view of the battery cell of FIG. 6, in accordance with one or more implementations.

FIG. 7 illustrates a top view of the battery cell 120 of FIG. 6, showing the first end 603 of the electrode roll 600. For example, the cross-sectional view of FIG. 6 may be taken along the line B-B shown in FIG. 7. The top view of FIG. 7 illustrates how, in an implementation in which the battery cell 120 is a cylindrical cell, the planar portion 609 of the current collector 602 may be a substantially circular planar portion having a substantially circular outer edge 700. As shown, the extension 610 extends from the substantially circular outer edge 700.

As shown in FIG. 7, the current collector 602 may include a central opening 611 in the planar portion 609. Referring back to FIG. 6, the central opening 611 may align with the axis 630 of the electrode roll 600 and allow access, through the opening 611, into an open bore 615 that extends along the axis 630 of the electrode roll 600. This access may be used, for example, to extend a sonicator or other welding instrument through the opening 611 and the open bore 615 for welding (e.g., ultrasonically welding) the extension 612 of the current collector 604 to the housing 215.

The examples of FIGS. 6 and 7 illustrate how the extension 610 may extend, at a first end 625 thereof, from the substantially circular outer edge 700, and may bend such that a second end 627 thereof is positioned over a portion of the central opening 611, the second end configured to be welded to the cap 620. In this way, the extension 610 may be moved or bent to allow access, such as by a welding tool (e.g., a sonicator), through the opening 611 and the open bore 615, for welding (e.g., ultrasonic welding) of to current collector (e.g., to the housing 215) and/or to the current collector 604 (e.g., welding of the tabs 616) at the second end 605 of the electrode roll 600. As shown in FIG. 7, the insulating layer 606 may have a substantially circular portion, and a wing 702. For example, the wing 702 may extend to or near an edge of the top surface of the electrode roll 600. As shown, the wing 702 may be positioned under a portion of the extension 610 that is located outward of the circular outer edge 700 of the current collector 602. In this way, the wing 702 may prevent contact between the extension 610 (e.g., a portion of the extension 610 that extends beyond the edge 700) and the electrode roll 600.

In one or more implementations, multiple tabs 614 (e.g., labeled C1, C2, C3, C4, and C5 in FIG. 7) may have multiple respective lengths, and the multiple respective lengths may increase (e.g., proportionally) with increasing radial distances of the origins of the tabs 616 from the axis 630. For example, as shown in the top view of FIG. 7, multiple tabs 614 (e.g., C1, C2, C3, C4, and C5 in FIG. 7) may extend from an electrode 607 (e.g., cathode 212) at multiple respective locations that are at multiple different respective distances (e.g., distances D1, D2, D3, D4, and D5) from the axis 630 of the electrode roll 600. As shown, the multiple respective locations may be at multiple different circumferential locations around the axis 630. In this way, each of the tabs 614 may be welded to the current collector 602 without overlapping with each other. In this way, providing the current collector 602 at the first end 603 of the electrode roll may reduce the thickness of the space occupied by the tabs 614 between the electrode roll 600 and the cap 620. This may allow the electrode roll 600 (e.g., and the electrodes, such as the anode 208 and the cathode 212, that have been rolled to form the electrode roll) to have a larger height (see, e.g., height H1 of FIG. 9 and height H2 of FIG. 10), and to more efficiently fill the space within the battery cell enclosure formed by the housing 215 and the cap 620. This may help to increase the capacity, energy density, and/or efficiency of the battery cell 120. For example, providing the current collector 602 and the current collector 604, and folding the tabs 614 and 616 into contact with the current collector 602 and the current collector 604 without overlapping the tabs 614 or the tabs 616 with each other may facilitate an increase in height of the anode 208 and/or the cathode 212 to fill from between ninety two percent and ninety nine percent of the space within the battery cell enclosure formed by the housing 215 and the cap 620 (e.g., in comparison with between eighty five percent and ninety two percent, in tabless or overlapping tab arrangements).

Figure 8:
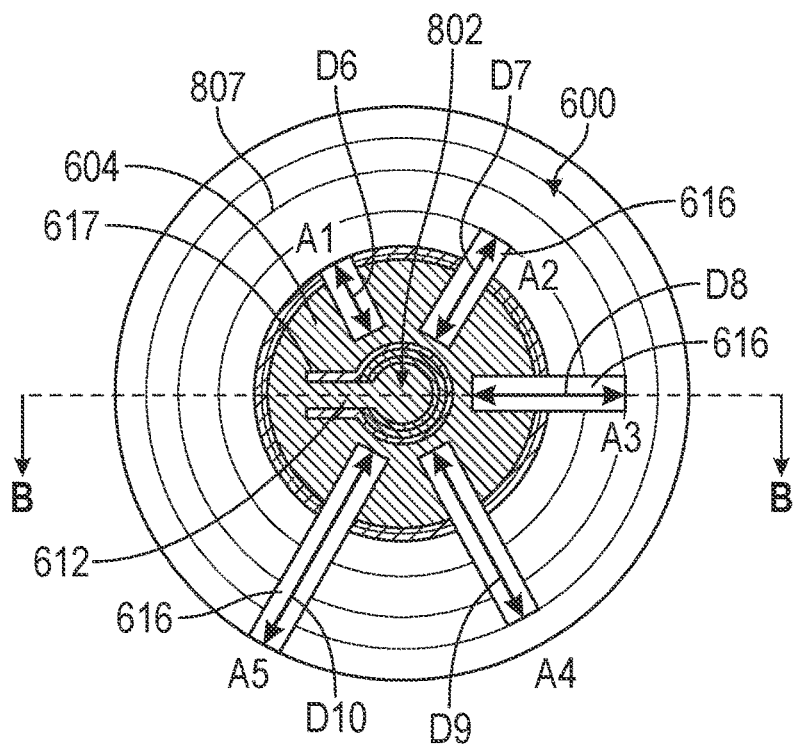
FIG. 8 illustrates a bottom view of the battery cell of FIG. 6, in accordance with one or more implementations.

FIG. 8 illustrates a bottom view of the battery cell 120 of FIG. 6, showing the second end 605 of the electrode roll 600. For example, the cross-sectional view of FIG. 6 may be taken along the line B-B shown in FIG. 6. The bottom view of FIG. 8 illustrates how, in an implementation in which the battery cell 120 is a cylindrical cell, the planar portion 617 of the current collector 604 may be a substantially circular planar portion. As shown, the extension 612 may extend from a location on the planar portion 617 that is between an inner radial edge and an outer radial edge of the planar portion 617.

As shown, the extension 612 may extend (e.g., monotonically) toward the axis 630 of the electrode roll 600, and/or may include a rounded or circular end portion 802. As shown in FIG. 8, the rounded or circular end portion 802 may align with the axis 630 of the electrode roll 600. The rounded or circular end portion 802 may be welded to the housing 215 of the battery cell 120 (e.g., to a negative terminal, such as terminal 216, on the housing 215).

In one or more implementations, multiple tabs 616 (e.g., labeled A1, A2, A3, A4, and A5 in FIG. 8) may have multiple respective lengths, and the multiple respective lengths may increase (e.g., proportionally) with increasing radial distances of the origins of the tabs 616 from the axis 630. For example, as shown in the bottom view of FIG. 8, multiple tabs 616 (e.g., A1, A2, A3, A4, and A5 in FIG. 8) may extend from an electrode 807 (e.g., anode 208) at multiple respective locations that are at multiple different respective distances (e.g., distances D6, D7, D8, D9, and D10) from the axis of the electrode roll 600. As shown, the multiple respective locations of the tabs A1, A2, A3, A4, and A5 may be at multiple different circumferential locations around the axis 630. In this way, each of the tabs 616 may be welded to the current collector 604 without overlapping with each other. In this way, providing the current collector 604 at the second end 605 of the electrode roll may reduce the thickness of the space occupied by the tabs 616 between the electrode roll 600 and the housing 215. This may allow the electrode roll 600 (e.g., and the electrodes that have been rolled to form the electrode roll) to have a larger height, and to more efficiently fill the space within the battery cell enclosure formed by the housing 215 and the cap 620. This may help to increase the capacity, energy density, and/or efficiency of the battery cell 120.

FIGS. 9 and 10 illustrate example electrodes that may be included in the electrode roll 600. For example, FIG. 9 illustrates an example implementation of the electrode 807 of FIG. 8 (e.g., anode 208), in an unrolled configuration (e.g., prior to being rolled into the electrode roll 600). For example, as shown in FIG. 9, the electrode 807 may include a current collector layer 903 (e.g., an implementation of the first current collector 206, such as a copper foil, of FIG. 2C). As shown, the current collector layer 903 may include a coated region 904 that is coated with a material, such as the anode material 209 of FIG. 2C. As shown, the coated region 904 may be a substantially rectilinear coated region in some implementations.

The current collector layer 903 may also include multiple uncoated regions 905 along an edge 910 of the current collector layer 903. In various implementations, the uncoated regions 905 may be formed by avoiding or preventing application of a coating material (e.g., anode material 209) in those regions of the current collector layer 903 (e.g., by performing an intermittent coating operation that includes pausing dispensation of the coating material during controlled periods and/or applying a masking structure to block the coating material), or by applying the coating material to the current collector layer 903 in a continuous coating operation and then removing (e.g., with a laser, such as by laser ablation) the coating material from certain portions of the current collector layer 903 to form the uncoated regions 905 as coating-removed regions. Forming the uncoated regions 905 as coating-removed regions can greatly reduce the time for producing the electrode 807 (e.g., by performing the continuous coating at a rate of as much as or more than one hundred meters of electrode per minute, in comparison with a rate of between thirty and forty meters per minute for an intermittent coating operation). As illustrated in FIG. 9, forming the uncoated regions 905 using a coating-removal process may allow the uncoated regions 905 to extend from the edge 910 only partway toward an opposing edge 912 (e.g., a portion of the coated region 904 may be disposed between an uncoated region 905 and the opposing edge 912. This may help increase the size of the coated region 904, which may help increase the capacity, energy density, and/or efficiency of the battery cell 120.

As shown, the multiple tabs 616 may extend, respectively from the multiple uncoated regions 905 of the current collector layer 903. For example, each of the tabs 616 may be welded to a respective one of the uncoated regions 905, such that each tab 616 extends beyond the edge 910 of the current collector layer 903, in a direction perpendicular to the edge 910. For example, the tabs 616 that are labeled A1-A5 in FIGS. 8 and 9 may, respectively, extend beyond the edge 910 by the distances D6-D10 of FIG. 8. In this way, the portions of the tabs 616 that extend beyond the edge 910 can reach the current collector 604 from various increasing respective radial distances, when the electrode 807 is rolled into a rolled configuration and the tabs 616 are folded over into contact with the current collector 604 (e.g., as shown in FIGS. 6 and 8).

FIG. 9 also illustrates how the tabs 616 that are labeled A1-A5 may have different respective lengths, L6-L10. For example, the lengths L6-L10 may be greater than the distances D6-D10 by the length of a portion of each respective tab 616 that extends below the edge 910 and that is welded into contact with the uncoated region 905 of the current collector layer 903. As shown, the lengths L6-L10, and resultingly the distances D6-D10, may increase with increasing distance from an edge 911 of the current collector layer 903 (e.g., an edge 911 that is perpendicular to the edge 910 from which the tabs 616 extend). In this way, the electrode 807 of FIG. 9 is configured such that, when the electrode 807 is rolled from the edge 911, and the uncoated regions 905 become located at increasing radial distances from the center (e.g., at the edge 911) of the roll, the tabs 616 of increasing length reach the current collector 604 across those increasing radial distances.

In one or more implementations, the uncoated regions 905 of the electrode 807 may be positioned such that, when the electrode 807 of FIG. 9 is rolled into a rolled configuration, the uncoated regions 905, and the tabs 616 extending therefrom, are located at various different radial distances from the center of the rolled electrode, and at various circumferential locations with respect to an axis of the roll (e.g., as illustrated in FIG. 8), so that when the tabs 616 are folded over, the tabs 616 do not overlap with each other. As shown, the edge 910 of the current collector layer 903 may coincide with an edge of the coated region 904 and an edge of the electrode 807.

In the example of FIG. 9, the electrode 807 includes a current collector layer 903, a coated region 904, multiple uncoated regions 905 spaced apart along an edge 910 of the current collector layer 903, and multiple tabs 616 electrically coupled to, and extending from, the multiple uncoated regions 905, respectively. In this example the multiple tabs 616 include at least a first tab (e.g., A1) having a first length (e.g., L6) and a second tab (e.g., A2, A3, A4, or A5) having a second length (e.g., L7, L8, L9, or L10) greater than the first length. For example, as discussed herein, the uncoated regions 905 may include coating-removed regions from which a portion of a coating (e.g., anode material 209) on the current collector layer 903 has been removed. In this example, the tabs 616 have multiple respective lengths (e.g., L6, L7, L8, L9, and L10) that increase with increasing distance from a first edge (e.g., edge 911) of the electrode. In this example, each tab 616 may be welded to a respective one of uncoated regions 905.

In the example of FIG. 9, the electrode 807 may form an anode for a cylindrical battery cell, and may be configured to be rolled into a cylindrical electrode roll (e.g., electrode roll 600), such that the multiple tabs 616 extend from the cylindrical electrode roll at multiple different radial distances (e.g., D6-D10, as shown in FIG. 8)) from an axis (e.g., axis 630) of the cylindrical electrode roll. FIG. 10 illustrates an example in which an electrode 607 may be implemented as a cathode for a cylindrical battery cell, and may be configured to be rolled into a cylindrical electrode roll (e.g., the electrode roll 600), such that multiple tabs 614 extend from the cylindrical electrode roll at a multiple different radial distances (e.g., D1-D5, as shown in FIG. 7) from an axis of the cylindrical electrode roll.

For example, FIG. 10 illustrates an example implementation of the electrode 607 of FIG. 7 (e.g., cathode 212), in an unrolled configuration (e.g., prior to being rolled into the electrode roll 600). For example, as shown in FIG. 10, the electrode 607 may include a current collector layer 1003 (e.g., an implementation of the second current collector 214, such as an aluminum foil, of FIG. 2C). As shown, the current collector layer 1003 may include a coated region 1004 that is coated with a material, such as the cathode material 211 FIG. 2C. As shown, the coated region 1004 may be a substantially rectilinear coated region in some implementations.

The current collector layer 1003 may also include multiple uncoated regions 1005. In various implementations, the uncoated regions 1005 may be formed by avoiding or preventing application of a coating material (e.g., cathode material 211) in those regions of the current collector layer 1003 (e.g., by performing an intermittent coating operation that includes pausing dispensation of the coating material during controlled periods and/or applying a masking structure to block the coating material), or by applying the coating material to the current collector layer 1003 in a continuous coating operation and then removing (e.g., with a laser, such as by laser ablation) the coating material from certain portions of the current collector layer 1003 to form the uncoated regions 1005 as coating-removed regions. For example, forming the uncoated regions 1005 as coating-removed regions can greatly reduce the time for producing the electrode 607 (e.g., by performing the continuous coating at a rate of as much as or more than one hundred meters of electrode per minute, in comparison with a rate of between thirty and forty meters per minute for an intermittent coating operation).

As shown, the multiple tabs 614 may extend, respectively from the multiple uncoated regions 1005 of the current collector layer 1003. For example, each of the tabs 614 may be welded to a respective one of the uncoated regions 1005, such that each tab 614 extends beyond the edge 1010 of the current collector layer 1003, in a direction perpendicular to the edge 1010. For example, the tabs 614 that are labeled C1-C5 in FIGS. 7 and 10 may, respectively, extend beyond the edge 1010 by the distances D1-D5 of FIG. 7. In this way, the portions of the tabs 614 that extend beyond the edge 1010 can reach the current collector 602 from various increasing respective radial distances, when the electrode 607 is rolled into a rolled configuration and the tabs 614 are folded over into contact with the current collector 602 (e.g., as shown in FIGS. 6 and 7).

FIG. 10 also illustrates how the tabs 614 that are labeled C1-C5 may have different respective lengths, L1-L5. For example, the lengths L1-L5 may be greater than the distances D1-D5 by the length of a portion of each respective tab 614 that extends below the edge 1010 and is welded into contact with the uncoated region 1005 of the current collector layer 1003. As shown, the lengths L1-L5, and resultingly the distances D1-D5, may increase with increasing distance from an edge 1011 of the current collector layer 1003 (e.g., an edge 1011 that is perpendicular to the edge 1010 from which the tabs 614 extend). In this way, the electrode 607 of FIG. 10 is configured such that, when the electrode 607 is rolled from the edge 1011, and the uncoated regions 1005 become located at increasing radial distances from the center (e.g., at the edge 1011) of the roll, the tabs 614 of increasing length reach the current collector 602 from those increasing radial distances.

In one or more implementations, the uncoated regions 1005 of the electrode 607 may be positioned such that, when the electrode 607 of FIG. 7 is rolled into a rolled configuration, the uncoated regions 1005, and the tabs 614 extending therefrom, are located at various different radial distances from the center of the rolled electrode, and at various circumferential locations with respect to an axis of the roll (e.g., as illustrated in FIG. 7), so that when the tabs 614 are folded over, the tabs 614 do not overlap with each other. As shown, the edge 1010 of the current collector layer 1003 may coincide with an edge of the coated region 1004 and an edge of the electrode 607.

In the example of FIG. 10, the electrode 607 includes a current collector layer 1003, a coated region 1004, multiple uncoated regions 1005 spaced apart along an edge 1010 of the current collector layer 1003, and multiple tabs 614 electrically coupled to, and extending from, the multiple uncoated regions 1005, respectively. In this example the multiple tabs 614 include at least a first tab (e.g., C1) having a first length (e.g., L1) and a second tab (e.g., C2, C3, C4, or C5) having a second length (e.g., L2, L3, L4, or L5) greater than the first length. For example, as discussed herein, the uncoated regions 1005 may include coating-removed regions from which a portion of a coating (e.g., cathode material 211) on the current collector layer 1003 has been removed. In this example, the tabs 614 have multiple respective lengths (e.g., L1, L2, L3, L4, and L5) that increase with increasing distance from a first edge (e.g., edge 1011) of the electrode. In this example, each tab 614 may be welded to a respective one of uncoated regions 1005.

As shown in the examples of FIGS. 6-10, the battery cell 120 may include a first rolled electrode layer (e.g., electrode 607 in a rolled configuration) including a first current collector layer (e.g., current collector layer 1003), and a second electrode layer (e.g., electrode 807 in a rolled configuration) including a second current collector layer (e.g., current collector layer 903). The battery cell 120 may include tabs 614 that extend from multiple respective uncoated regions 1005 of the first current collector layer, and tabs 616 that extend from multiple respective uncoated regions 905 of the second current collector layer. The tabs 614 may extend from respective uncoated regions 1005 into contact with the current collector 602. The tabs 616 may extend from respective uncoated regions 905 of the second current collector layer into contact with the current collector 604.

Figure 11:
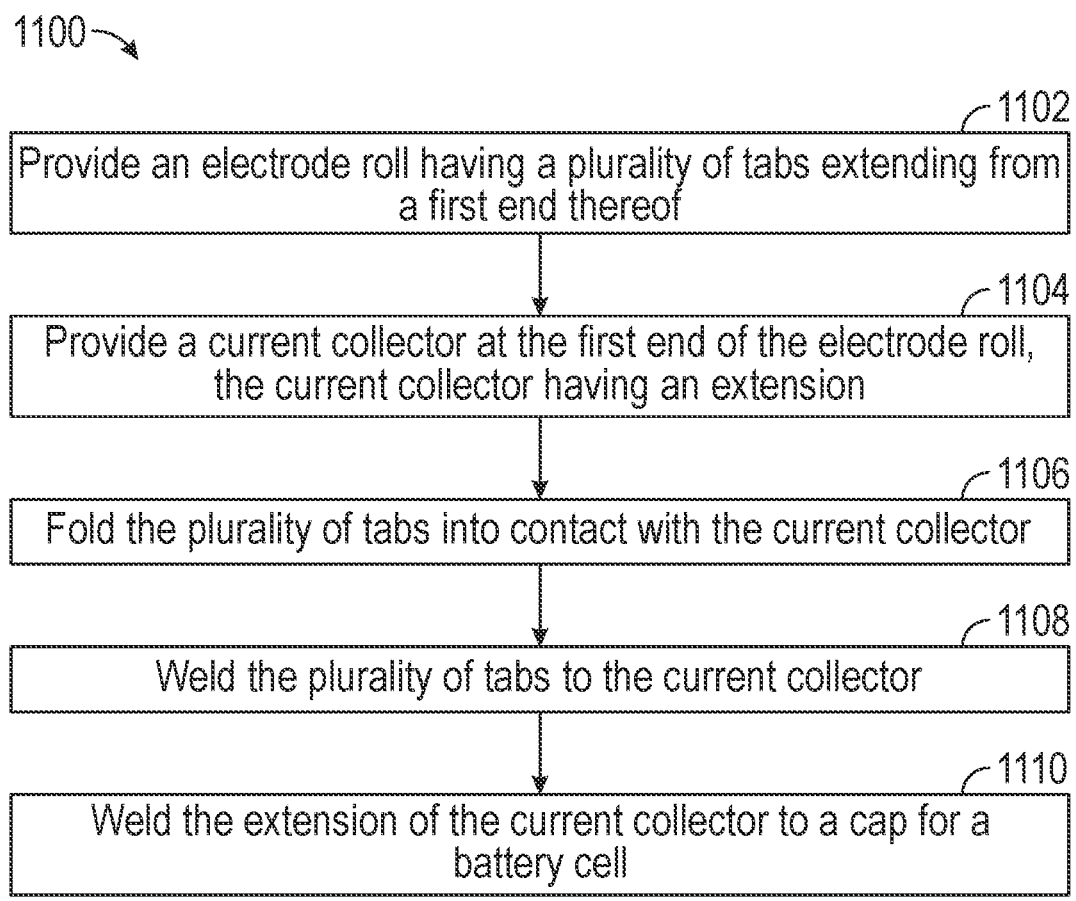
FIG. 11 illustrates a flow chart of illustrative operations that may be performed for manufacturing a battery cell in accordance with one or more implementations.

FIG. 11 illustrates a flow diagram of an example process 1100 that may be performed for assembling a battery, in accordance with implementations of the subject technology. For explanatory purposes, the process 1100 is primarily described herein with reference to the battery cell 120 of FIGS. 1-10. However, the process 1100 is not limited to the battery cell 120 of FIGS. 1-10, and one or more blocks (or operations) of the process 1100 may be performed by one or more other structural components of other suitable moveable apparatuses, devices, or systems. Further for explanatory purposes, some of the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

As illustrated in FIG. 11, at block 1102, an electrode roll (e.g., electrode roll 600, such as a cylindrical electrode roll) having a plurality of tabs (e.g., tabs 614) extending from a first end (e.g., first end 603) thereof may be provided. In various implementations, the electrode roll 600 may be implemented as a jelly roll (e.g., for cylindrical battery cell implementations, or a jelly stack (e.g., for prismatic or other stacked battery cell implementations). In one or more implementations, the electrode roll may include a plurality of additional tabs (e.g., tabs 616) extending from a second end (e.g., second end 605) of the electrode roll.

In one or more implementations, providing the electrode roll may include obtaining an electrode layer (e.g., electrode 607) having the plurality of tabs extending from a plurality of respective locations along an edge (e.g., edge 1010) of the electrode layer (e.g., as shown in FIG. 10); and rolling the electrode layer and at least one additional electrode layer (e.g., electrode 807, such as with one or more insulating layers between the electrode layers) to form the electrode roll. In one or more implementations, obtaining the electrode layer having the plurality of tabs extending from the plurality of respective locations along the edge of the electrode layer may include obtaining a current collector layer (e.g., current collector layer 903 or current collector layer 1003); providing a coating (e.g., anode material 209 or cathode material 211) on a surface of the current collector layer; removing a plurality of portions of the coating from a plurality of respective regions along an edge (e.g., edge 910 or edge 1010) of the current collector layer; and welding the plurality of tabs to the plurality of respective regions (e.g., uncoated regions 905 or uncoated regions 1005) along the edge of the current collector layer.

At block 1104, a current collector (e.g., current collector 602) may be provided at the first end of the electrode roll. The current collector may include an extension (e.g., extension 610). The extension may extend from a radial outer edge of a planar portion of the current collector.

At block 1106, the plurality of tabs may be folded into contact with the current collector. For example, folding the plurality of tabs into contact with the current collector may include folding the plurality of tabs into contact with the current collector without overlapping the plurality of tabs.

At block 1108, the plurality of tabs may be welded to the current collector. For example, the tabs may each be welded to a unique location on the current collector without overlapping the tabs.

At block 1110, the extension of the current collector may be welded to a cap (e.g., cap 620) for a battery cell (e.g., battery cell 120). For example, the extension of the current collector may be welded to a positive terminal (e.g., terminal 622) on the cap.

In one or more implementations, the process 1100 may also include providing an insulator (e.g., insulator layer 606) on the first end of the electrode roll, and providing the current collector on the insulator.

In one or more implementations, the process 1100 may also include providing an additional current collector (e.g., current collector 604) at the second end of the electrode roll. The additional current collector may include an additional extension (e.g., extension 612). In one or more implementations, the process 1100 may also include folding the plurality of additional tabs into contact with the additional current collector; welding the plurality of additional tabs to the additional current collector; and welding the additional extension of the additional current collector to a housing for the battery cell. For example, welding the plurality of additional tabs to the additional current collector may include welding the plurality of additional tabs to the additional current collector via an opening (e.g., opening 611) in the current collector (e.g., and via an open bore 615 in the electrode roll).

Aspects of the subject technology can help improve the efficiency, energy density, and/or power capacity of battery cells, which can improve the efficiency and range of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A battery cell, comprising:
   an electrode roll having a first end, an opposing second end, an axis extending from the first end to the opposing second end, and at least one rolled electrode;
   a current collector arranged perpendicularly to the axis and mounted to the first end;
   a plurality of tabs extending from the at least one rolled electrode to the current collector; and
   an insulating layer arranged perpendicularly to the axis and having a first surface in direct contact with the first end of the electrode roll and a second surface in direct contact with the current collector, wherein the current collector comprises a contiguous structure that includes:
     a planar portion arranged perpendicularly to the axis, and
     a first extension that extends away from the planar portion into contact with a cap of the battery cell,
   wherein the plurality of tabs extend from the at least one rolled electrode to the current collector without overlapping with each other.

2. The battery cell of claim 1, wherein the plurality of tabs have a plurality of respective lengths, and wherein the plurality of respective lengths increase with increasing radial distance of the tabs from the axis.

3. The battery cell of claim 1, wherein the plurality of tabs extend from the at least one rolled electrode at a plurality of respective locations that are at a plurality of different respective distances from the axis of the electrode roll.

4. The battery cell of claim 3, wherein the plurality of respective locations are at a plurality of different circumferential locations around the axis.

5. The battery cell of claim 1, wherein the at least one rolled electrode comprises:
   a first rolled electrode layer comprising a first current collector layer; and
   a second electrode layer comprising a second current collector layer.

6. The battery cell of claim 5, wherein the plurality of tabs extend from a plurality of respective uncoated regions of the first current collector layer, and wherein the battery cell further comprises an additional plurality of tabs that extend from an additional plurality of respective uncoated regions of the second current collector layer.

7. The battery cell of claim 6, further comprising an additional current collector arranged perpendicularly to the electrode roll and mounted to the opposing second end of the electrode roll.

8. The battery cell of claim 7, wherein the additional plurality of tabs extend from the additional plurality of respective uncoated regions of the second current collector layer into contact with the additional current collector.

9. The battery cell of claim 8, wherein the additional current collector comprises an additional contiguous structure that includes a planar portion arranged perpendicularly to the electrode roll and a second extension that extends away from the planar portion of the additional current collector and into contact with a housing of the battery cell.

10. A battery subassembly, comprising:
    a plurality of battery cells, each battery cell comprising:
      an electrode roll having a first end, an opposing second end, an axis extending from the first end to the opposing second end, and at least one rolled electrode;
      a current collector arranged perpendicularly to the axis and mounted to the first end;
      a plurality of tabs extending from the at least one rolled electrode to the current collector; and
      an insulating layer arranged perpendicularly to the axis and having a first surface in direct contact with the first end of the electrode roll and a second surface in direct contact with the current collector, wherein the current collector comprises a contiguous structure that includes:
        a planar portion arranged perpendicularly to the axis, and
        a first extension that extends away from the planar portion into contact with a cap of the battery cell,
      wherein the plurality of tabs extend from the at least one rolled electrode to the current collector without overlapping with each other.

11. The battery subassembly of claim 10, wherein the plurality of tabs have a plurality of respective lengths, and wherein the plurality of respective lengths increase with increasing radial distance of the tabs from the axis.

12. The battery subassembly of claim 10, wherein the plurality of tabs extend from the at least one rolled electrode at a plurality of respective locations that are at a plurality of different respective distances from the axis of the electrode roll.

13. The battery subassembly of claim 10, wherein each battery cell further comprises an additional current collector arranged perpendicularly to the electrode roll and mounted to the opposing second end of the electrode roll.

14. The battery subassembly of claim 13, wherein an additional plurality of tabs extend from an additional plurality of respective uncoated regions of a second current collector layer of each battery cell into contact with the additional current collector.

15. The battery subassembly of claim 14, wherein the additional current collector comprises a planar portion arranged perpendicularly to the electrode roll and a second extension that extends away from the planar portion of the additional current collector and into contact with a housing of each battery cell.

16. A vehicle, comprising:
    a battery cell disposed within the vehicle, the battery cell comprising:
      an electrode roll having a first end, an opposing second end, an axis extending from the first end to the opposing second end, and at least one rolled electrode;
      a current collector arranged perpendicularly to the axis and mounted to the first end;
      a plurality of tabs extending from the at least one rolled electrode to the current collector; and
      an insulating layer arranged perpendicularly to the axis and having a first surface in direct contact with the first end of the electrode roll and a second surface in direct contact with the current collector, wherein the current collector comprises a contiguous structure that includes:
 a planar portion arranged perpendicularly to the axis, and
 a first extension that extends away from the planar portion into contact with a cap of the battery cell,
wherein the plurality of tabs extend from the at least one rolled electrode to the current collector without overlapping with each other.

* * * * *